US008650630B2

(12) United States Patent
Choyi et al.

(10) Patent No.: US 8,650,630 B2
(45) Date of Patent: *Feb. 11, 2014

(54) SYSTEM AND METHOD FOR EXPOSING MALICIOUS SOURCES USING MOBILE IP MESSAGES

(75) Inventors: Vinod K. Choyi, Ottawa (CA); Bassem Abdel-Aziz, Kanata (CA)

(73) Assignee: Alcatel Lucent, Paris (FR)

( * ) Notice: Subject to any disclaimer, the term of this patent is extended or adjusted under 35 U.S.C. 154(b) by 1063 days.

This patent is subject to a terminal disclaimer.

(21) Appl. No.: 12/233,474

(22) Filed: Sep. 18, 2008

(65) Prior Publication Data

US 2010/0071051 A1    Mar. 18, 2010

(51) Int. Cl.
*G06F 9/00* (2006.01)

(52) U.S. Cl.
USPC .......................................................... 726/12

(58) Field of Classification Search
USPC ............................................ 713/201; 726/12
See application file for complete search history.

(56) References Cited

U.S. PATENT DOCUMENTS

| 2004/0068668 | A1* | 4/2004 | Lor et al. ...................... 713/201 |
| 2008/0163354 | A1* | 7/2008 | Ben-Shalom et al. .......... 726/12 |
| 2009/0204725 | A1* | 8/2009 | Liu et al. ....................... 709/246 |

FOREIGN PATENT DOCUMENTS

| WO | WO2009/032379 | * | 3/2009 | ............. G06F 12/14 |
| WO | WO 2009032379 A1 | * | 3/2009 | |

* cited by examiner

*Primary Examiner* — William Goodchild
(74) *Attorney, Agent, or Firm* — Garlick & Markison; Holly L. Rudnick

(57) ABSTRACT

Malicious sources within networks are identified using bait traffic, including mobile IP messages, transmitted between a collaborating network device and a collaborating mobile client that has a fixed connection to the network. The bait traffic entices a malicious source to transmit malicious packets towards the collaborating mobile client and/or the network device. Upon receiving a malicious packet, the collaborating mobile client or the network device is able to identify the source of the packet as a malicious source and report the presence of the malicious source within the network.

20 Claims, 3 Drawing Sheets

SYSTEM AND METHOD FOR EXPOSING MALICIOUS SOURCES USING MOBILE IP MESSAGES

BACKGROUND OF THE INVENTION

1. Technical Field of the Invention

The present invention relates in general to network security, and in particular, to identifying malicious sources within networks.

2. Description of Related Art

Network security is an important part of any network infrastructure. Network administrators adopt policies and implement various measures to prevent unauthorized access and protect networks against attackers who send spam, release worms or perform other illegal actions using the network. The most common way to secure a network is to allow access only from known, authenticated users using an authentication process, e.g., user name and password. However, this approach provides no security against "sniffing" and attackers can easily spoof legitimate network addresses. In addition, authentication procedures do not check the content of messages, and therefore, provide no protection against potentially harmful content, such as computer worms being transmitted over the network.

Another network security measure commonly used in networks is an intrusion prevention system (IPS). An IPS is a network device that monitors the network and/or system activities for malicious or unwanted behavior and can react, in real-time, to block or prevent those activities. A network-based IPS, for example, will operate in-line to monitor all network traffic for malicious codes or attacks. When an attack is detected, the IPS can drop the malicious packets, while still allowing other traffic to pass.

However, it is relatively easy for worms to change signatures. Therefore, IPS devices that use signature-based methods to detect worms are useless against zero-day attacks. In addition, IPS devices have had difficulty detecting stealth network worms. Stealth worms pose a major threat to Internet users and on-line businesses in that they are typically the vehicle of choice for many identity theft and financial fraud attackers. Stealth worms evade detection by minimizing the number of packets they send. For example, a stealth worm may perform target discovery to identify new victim hosts by sending packets at a very low rate, for instance, a few packets per week. Since the rate of malicious packets is low as compared to normal traffic in a network, it is difficult for traditional IPS devices to detect stealth worms using traditional traffic anomaly analysis methods. Detection of stealth worms can be improved by increasing the sensitivity of IPS devices to traffic anomalies. However, increasing the detection sensitivity also leads to a high rate of false positives.

In addition to an IPS, some networks utilize honeypots, which are essentially decoy network-accessible resources that are deployed in a network as surveillance and early-warning tools. A honeypot is typically a standalone host which presents itself to the network as a server that provides a specific service (i.e., web server, mail server, etc.). Honeypots are passive by nature, waiting for a worm to send packets to them. The techniques used by attackers that attempt to compromise the honeypot are studied during and after an attack to help tighten the security provided by the IPS. However, many worms, especially stealth worms, are able to detect honeypots, and therefore, avoid sending packets to the honeypots.

SUMMARY OF THE INVENTION

Embodiments of the present invention provide a collaborating network device within a network that is operable to transmit and receive bait traffic, including mobile IP messages, to and from a collaborating mobile client that has a fixed connection to the network. The network device is further coupled to receive an IP packet from a source other than the collaborating mobile client, and operable to determine whether the IP packet is a malicious packet, and if so, to identify the source as a malicious source.

In one embodiment, the collaborating mobile client is associated with a home network, the network is a visiting network, the network device is a foreign agent within the visiting network and the source is an infected host within the visiting network. In another embodiment, the network is a home network of the collaborating mobile client, the network device is a home agent of the collaborating mobile client and the source is an infected host within the home network. In yet another embodiment, the network is a home network of the collaborating mobile client, the collaborating mobile client is located in a visiting network, the network device is a home agent of the collaborating mobile client within the home network and the source is a malicious client that is fixed or mobile within a core network coupled between the home network and the visiting network.

In an exemplary embodiment, the network device is a layer 3 switch, router or server and the network interface reserves a plurality of unused addresses and bait addresses and provides at least one of the bait addresses to the collaborating mobile client to facilitate transmission of the Mobile IP messages to and from the collaborating mobile client and to enable the malicious source to send the malicious packet to the network device. The Mobile IP messages can include at least one of a Mobile IP Agent Solicitation message originated by the collaborating mobile client, a Mobile IP Agent Advertisement message originated by the network device and a Mobile IP Registration message originated by the collaborating mobile client or the network device.

In another exemplary embodiment, the IP packet has a spoofed source address identifying the collaborating mobile client, and the network device is operable to identify the IP packet as a malicious packet based on a message type or header values within the IP packet.

In a further embodiment, the network device maintains a policy table that indicates types of bait packets transmitted between the network device and the collaborating mobile client. The policy table can further include a schedule specifying a frequency or time for transmitting the bait packets between the network device and the collaborating mobile client.

In yet a further embodiment, the network device is coupled to a network administrator within the network, and operates to notify the network administrator of the presence of the malicious source in the network.

Embodiments of the present invention further provide a network for identifying a malicious source. The network includes a collaborating mobile client having a fixed connection to the network that is coupled to transmit and receive bait traffic through the network, in which the bait traffic including mobile Internet Protocol (IP) messages, and a collaborating network device coupled to transmit and receive the bait traffic to and from the collaborating mobile client. At least one of the collaborating mobile client and the collaborating network device is coupled to receive an IP packet from a source other than the collaborating mobile client or the collaborating network device and operable to determine whether the IP packet is a malicious packet, and if so, to identify the source as a malicious source.

Embodiments of the present invention further provide a method for identifying malicious sources within a network.

The method includes transmitting bait traffic between a collaborating mobile client having a fixed connection to the network and a collaborating network device, in which the bait traffic including mobile Internet Protocol (IP) messages. The method further includes receiving an IP packet at the collaborating mobile client or the collaborating network device from a source other than the collaborating mobile client or the collaborating network device, determining whether the IP packet is a malicious packet, and if so, identifying the source as a malicious source and reporting the presence of the malicious source in the network.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
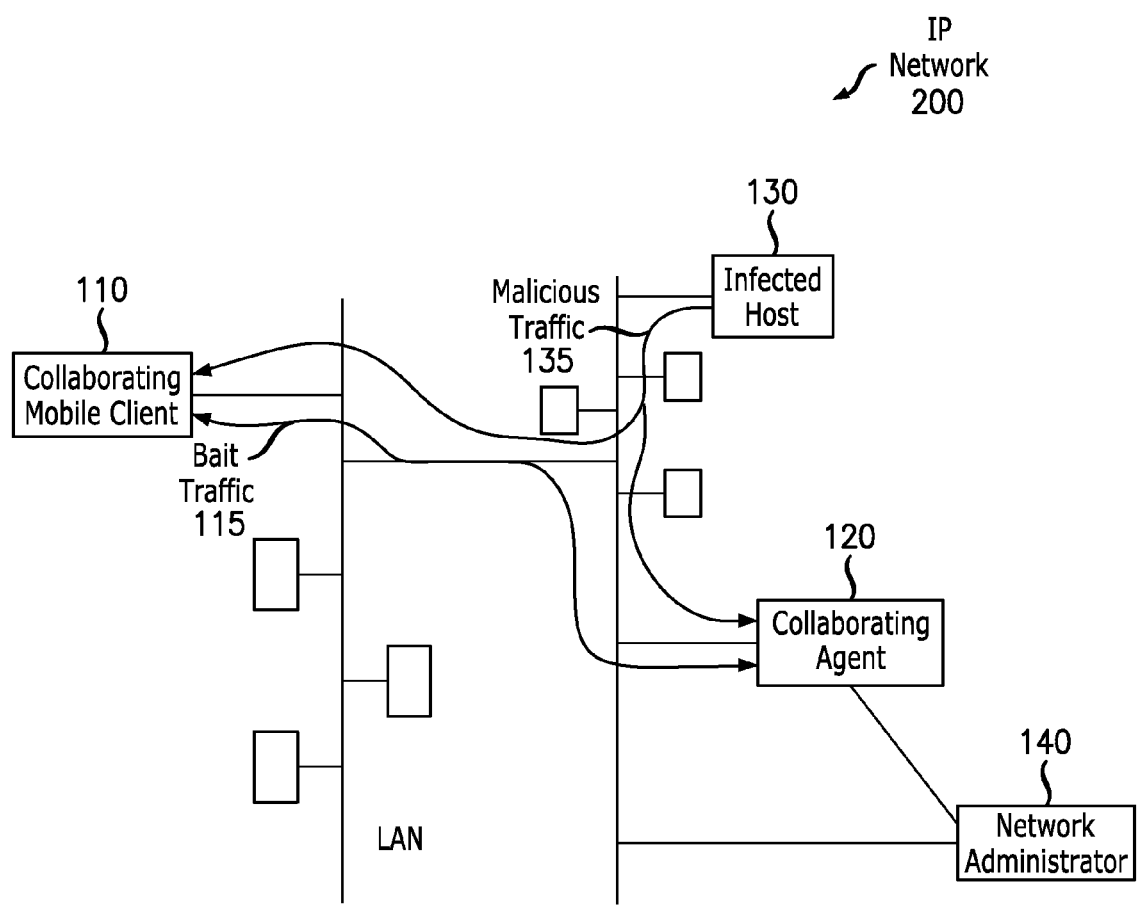
FIG. 1 illustrates an exemplary network for exposing malicious sources, in accordance with embodiments of the present invention.

Referring to FIG. 1, there is illustrated an exemplary Internet Protocol (IP) network 100 capable of implementing various embodiments of the present invention. The IP network 100 shown in FIG. 1 is a Local Area Network (LAN) to which mobile communication devices (clients) can connect via a wireless access network (not shown) coupled to the LAN 100. The network 100 shown in FIG. 1 includes a bait or collaborating mobile client 110 and a bait or collaborating network device 120 configured to implement "worm-fishing" to identify malicious traffic and malicious sources within the network.

The collaborating mobile client 110 mimics a mobile client, but has a fixed connection to the network. Thus, the collaborating mobile client 110 does not couple to a wireless access point to gain access to the network, but instead has a direct connection to the network 100. In one embodiment, the collaborating mobile client 110 and collaborating network device 120 are implemented on the same device. In another embodiment, the collaborating mobile client 110 and collaborating network device 120 are stand-alone devices positioned within the network 100 to be in communication with each other. By implementing the collaborating mobile client 110 within the network 100, malware meant for mobile devices can be targeted in addition to malware intended against fixed network nodes.

The collaborating mobile client 110 and collaborating network device 120 are "fake" network elements that operate as "worm fishers" to lure or entice attackers, such as infected host 130, to send malicious traffic 135 to the fake mobile client 110 and/or the fake network device 120. For example, the collaborating mobile client 110 and collaborating network device 120 can send bait traffic 115, such as mobile IP messages, therebetween to make the infected host 130 think that the collaborating network device 120 is an actual network device, such as a layer 3 or above router, switch or server or any other network node, and that the collaborating mobile client 110 is an actual wireless (mobile) communications device, such as a cell phone, laptop computer or personal digital assistant (PDA).

The collaborating network device 120 reserves a number of unused addresses as bait addresses and provides one of the bait addresses to the collaborating mobile client 110 to communicate with the collaborating mobile client, as described below. The collaborating mobile client 110 is further configured with any other authentication/encryption keys needed to initiate communications with the collaborating network device 120.

The bait traffic 115 can be sent upon manual configuration or by having a "script" that specifies the frequency or time for different bait packets to be sent. For example, the collaborating mobile client 110 and collaborating network device 120 can each maintain a policy table that indicates the type of bait packets and possibly a schedule for sending these packets out (set manually or based on the script). The policy table can also include any responses that are expected normally (either by packet detail or by a timing window). The policy table can further define set pre-agreed values to be included in each of the bait mobile IP messages to assist the collaborating mobile client 110 and collaborating network device 120 in identifying malicious traffic.

In addition, the bait traffic 115 is selected to include messages that normal hosts do not need to respond to or to which normal replies can be easily filtered. For example, in one embodiment, the mobile IP messages can include a mobile IP (MIP) Agent Solicitation message originated by the collaborating mobile client 110 using a broadcast address as the "sender address" and a MIP Agent Advertisement message sent by the network device 120 in response to the MIP Agent Solicitation message. The MIP Agent Advertisement message can also be sent by the network device 120 periodically to advertise the network device's 120 services to the network 100, and therefore, provide periodic bait messages. In addition, the mobile IP messages can include a MIP Registration message originated by the collaborating mobile client 110 to register with the collaborating network device 120 and a MIP Registration reply sent by the network device 120 in response to the MIP Registration message.

In this embodiment, the network device 120 operates as a foreign agent within a "visiting" network, as described in Request for Comments (RFC) 3220 ("IP Mobility Support for IPv4) published by the Internet Engineering Taskforce in January 2002. As used herein, the term "foreign agent" refers to a switch, router or server on a network that is being "visited" by a mobile client and that provides services to the mobile client while the mobile client is registered on the visited network. For example, as shown in FIG. 1, the collaborating mobile client 110 can be associated with a home network (not shown), and network 100 can be a "visiting" network on which the collaborating mobile client registers to receive mobile IP service. While registered with the "visiting" network, a "care-of-address" (CoA) is associated with the mobile client that reflects the mobile client's current point of attachment (i.e., foreign agent 120). The CoA is one of the bait addresses reserved by the foreign agent 120. An infected host 130 can target this CoA to attempt to attack the collaborating mobile client 110.

In another embodiment, the network 100 is the home network of the collaborating mobile client and the network device 120 is a home agent of the collaborating mobile client. As used herein, the term "home agent" refers to a switch, router or server on a mobile client's home network. In this embodiment, one of the bait addresses reserved by the collaborating home agent is the long-term IP address assigned to the collaborating mobile client 110 on the home network.

In yet another embodiment, the network 100 operates as both the home network and the visiting network, such that the collaborating home agent, collaborating foreign agent and collaborating mobile client are all implemented on the same network. In this embodiment, the collaborating mobile client 110 uses the long-term IP address (bait address) associated with the home agent to transmit mobile IP messages to/from the collaborating home agent, and the CoA (bait address) associated with the foreign agent to transmit mobile IP messages to/from the collaborating foreign agent. In addition, the foreign agent can communicate with the home agent, for example, by sending the MIP registration message with the CoA of the collaborating mobile client, to the home agent.

In any of the above embodiments, since legitimate mobile clients are not configured to connect to the collaborating foreign agent or the collaborating home agent, any packets specifically addressed to the collaborating foreign agent or collaborating home agent from a source other than the collaborating mobile client can be assumed to be scan/attack packets from malicious sources. However, the collaborating mobile client 110 and collaborating network device 120 may still receive broadcast messages from legitimate sources. In this case, the collaborating mobile client 110 and collaborating network device are configured to not respond to any message from a source that is not the collaborating mobile client 110 or collaborating network device 120.

Attackers/worms resident on an infected host 130 are able to capture the traffic between the collaborating mobile client 110 and the collaborating network device 120 and determine that the collaborating mobile client 110 and collaborating network device are present in the network 100. For example, the infected host 130 can record the source address of the bait packet and use it to spread the worm by later sending one or more probe/scanning packets to the bait address it has recorded. In one embodiment, when the infected host 130 sends traffic, such as a scan or attack IP packet, towards the collaborating mobile client 110 and/or collaborating network device 120, the collaborating mobile client 110 and/or collaborating network device 120 is able to determine that the received IP packet is a malicious packet based on the source address of the scan or attack IP packet. In another embodiment, the collaborating mobile client 110 and the collaborating network device 120 each define set pre-agreed values to be included in each of the mobile IP messages sent between the collaborating mobile client 110 and collaborating network device 120. Therefore, when an IP packet is received with different values, the IP packet can be identified as a malicious packet sent by a malicious source "spoofing" the address of the collaborating mobile client 110 or collaborating network device 120.

Once a malicious packet has been identified, the collaborating mobile client 110 or collaborating network device 20 flags the host as infected and logs the scan/attack for use in identifying the worm and taking proper action. For example, in one embodiment, the infected host can be disconnected or quarantined. In another embodiment, the collaborating mobile client 110 or collaborating network device 120 can notify a network administrator 140 (e.g., an IPS or system administrator) within the network 100 of the existence of the malicious client 130. The network administrator 140 can then take steps to identify the worm and prevent the worm from infecting any other network elements (e.g., switches, routers, servers, computers, wireless access points and other elements within the network 100). By luring malicious sources 130 to attack a preselected "fake" mobile client 110 or "fake" network device 120, malicious traffic is not mixed with good traffic, making it easier to identify malicious traffic even if the malicious client 130 is stealthy.

Although network 100 is shown as a LAN, it should be understood that in other embodiments, network 100 can include any wireline, wireless, satellite, or cable network arrangement, or a combination thereof. For example, network 100 may comprise a public packet-switched network such as the Internet that is accessible via suitable access means including both narrowband (e.g., dial-up) and broadband (e.g., cable, digital subscriber line or DSL, etc.) access mechanisms. Alternatively, network 150 may be implemented as wireless packet data service network, such as the General Packet Radio Service (GPRS) network, that provides packet radio access for mobile devices using the cellular infrastructure of a Global System for Mobile Communications (GSM)-based carrier network.

Figure 2:
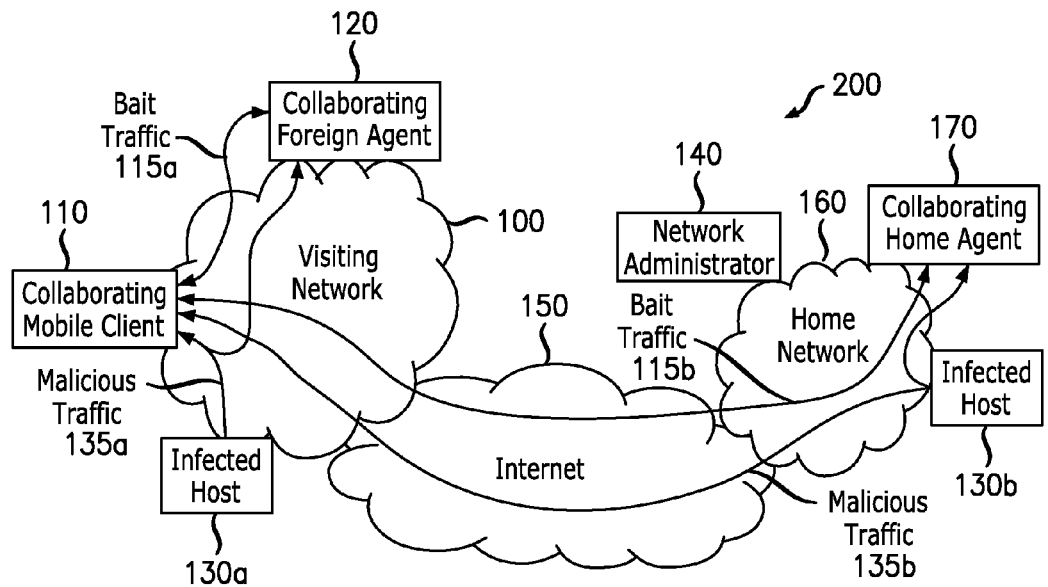
FIG. 2 illustrates another exemplary network for exposing malicious sources, in accordance with embodiments of the present invention.

FIG. 2 illustrates another exemplary network 200 for exposing malicious sources, in accordance with embodiments of the present invention. In FIG. 2, the collaborating mobile client 110 is connected to a visiting network 100 on which a collaborating foreign agent 120 is resident. In addition, a collaborating home agent 170 is shown on a home network 160 of the collaborating mobile client 110. The visiting network 100 and home network 160 are connected via a core network, such as the Internet 150.

The collaborating mobile client 110 and collaborating foreign agent 120 are configured to send bait traffic 115*a* therebetween. In addition, the collaborating mobile client 110 and the collaborating home agent 170 are configured to send bait traffic 115*b* therebetween. Although not shown, the bait traffic 115*b* between the collaborating mobile client 110 and collaborating home agent 170 may be sent through the collaborating foreign agent 120. For example, a MIP registration message may be sent from the collaborating mobile client 110 to the collaborating home agent 170 via the collaborating foreign agent 120. Therefore, as shown in FIG. 2, wormfishing can be used to identify worms within the core network and spanning multiple networks.

When an infected host 130*a* or 130*b* within the visiting network 100 or the home network 160 sees MIP registration messages sent between the collaborating mobile client 110 and the collaborating foreign agent 120 and between the collaborating mobile client 110 and the collaborating home agent 170, the infected host 130*a* or 130*b* may try to scan the addresses of the collaborating mobile client 110, collaborating home agent 170, collaborating foreign agent 120 and the CoA associated with the collaborating mobile client 110 while registered with the visiting network 100. The infected host 130*a* or 130*b* may also attempt to exploit the MIP service and launch attacks against one or more of the collaborating mobile client 110, collaborating home agent 170 and collaborating foreign agent 120 by transmitting malicious traffic 135*a* and 135*b*.

For example, infected host 130*a* may transmit malicious traffic 135*a* towards the collaborating mobile client 110 and the collaborating foreign agent 120, while infected host 130*b* may transmit malicious traffic 135*b* towards the collaborating mobile client 110, the collaborating foreign agent 120 and the collaborating home agent 170. Upon detecting the malicious traffic at the collaborating mobile client 110, collaborating foreign agent 120 or collaborating home agent 170, a network administrator 140 within the home network 160 or visiting network 100 can be notified.

Figure 3:
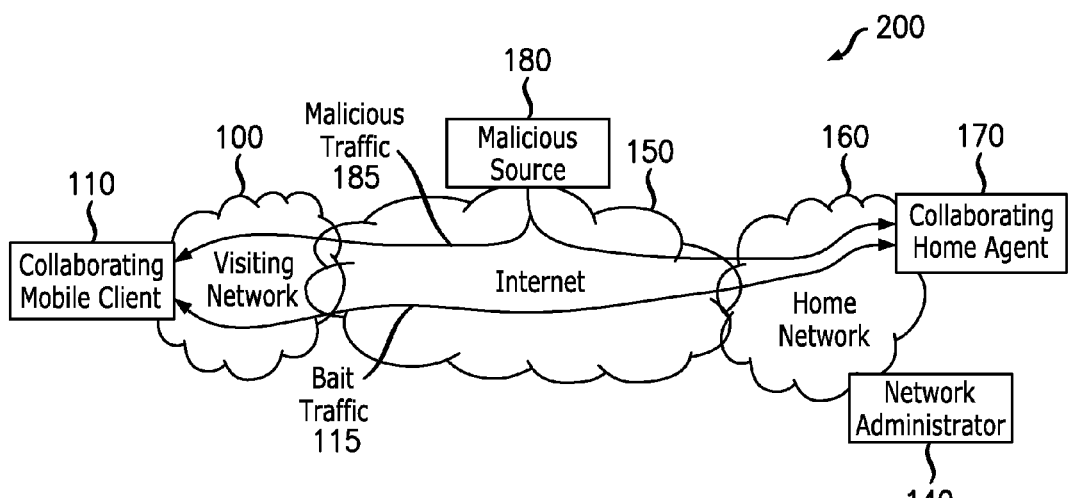
FIG. 3 illustrates yet another exemplary network for exposing malicious sources, in accordance with embodiments of the present invention.

FIG. 3 illustrates yet another exemplary network 200 for exposing malicious sources, in accordance with embodiments of the present invention. In FIG. 3, the collaborating mobile client 110 and the collaborating home agent 170 are configured to send bait traffic 115 therebetween. Although not shown, the bait traffic 115 between the collaborating mobile client 110 and collaborating home agent 170 may be sent through the collaborating foreign agent (not shown). For example, a MIP registration message may be sent from the collaborating mobile client 110 to the collaborating home agent 170 via the collaborating foreign agent.

A malicious source 180, such as a mobile or fixed client, within the core network 150, visited network 100 or the home network 160 (the former being shown) snoops on the MIP registration messages sent between the collaborating mobile client 110 and the collaborating home agent 170 and obtains the IP addresses of both the collaborating mobile client 110 (CoA) and the home agent 170. The malicious source 180 can then launch scans or attacks against one or more of the collaborating mobile client 110 and collaborating home agent 170 by transmitting malicious traffic 185.

Upon detecting the malicious traffic at the collaborating mobile client 110 or collaborating home agent 170, the collaborating mobile client 110 and/or collaborating home agent 170 stores the address of the malicious source 180 and/or stores the packet for further processing (i.e., signature-extraction). In addition, a network administrator 140 within the home network 160 can be notified.

Figure 4:
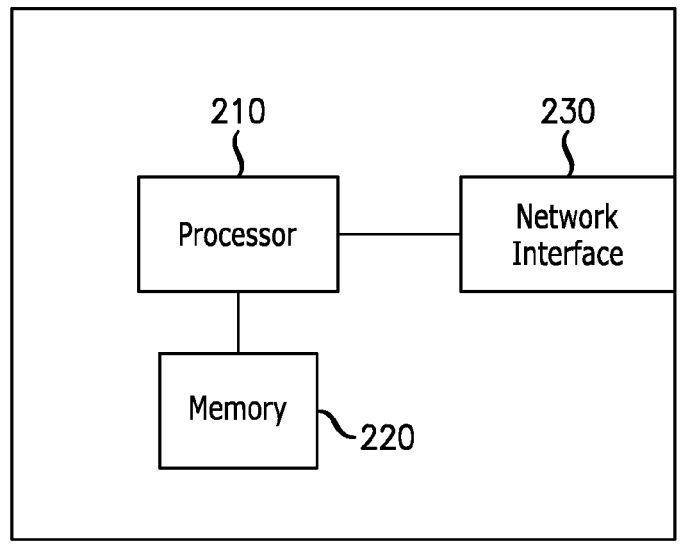
FIG. 4 is a block diagram of a collaborating network element capable of identifying malicious sources, in accordance with embodiments of the present invention.

FIG. 4 is a block diagram of a collaborating network element, such as a collaborating mobile client 110, collaborating foreign agent 120 or a collaborating home agent 170, capable of identifying malicious traffic, in accordance with embodiments of the present invention. The collaborating network element includes a network interface 230, processor 210 and memory 220.

The processor 210 is coupled to provide mobile IP messages to the network interface 230 for transmission to one or more additional collaborating network elements. In addition, the processor 210 is coupled to receive IP packets from the network interface 230 and is operable to process the received IP packets to determine whether the received IP packet is a malicious packet sent from a malicious source present in the network. The memory 220 maintains a list of bait addresses to be used by collaborating clients and an identity of each collaborating client assigned to one or more of the bait addresses. In addition, the memory 220 includes a policy table including types of bait packets to be sent, pre-set values for the bait packets, sequences of bait packets to be transmitted to/from collaborating network elements, a schedule of when to send these packets out and any other information that can be used by the processor 210 to identify malicious sources in the network.

For example, in one embodiment, the processor 210 is coupled to the memory 220 to retrieve instructions for processing a received IP packet, along with criteria (e.g., known collaborating addresses, pre-set message values, pre-set message sequences and timing, etc.) for use in determining whether the received IP packet was originated by a collaborating network element or a malicious source. Once the processor 210 identifies the presence of a malicious source in the network, the processor 210 can transmit a notification message to the network administrator via the network interface 230. The notification message includes one or more of the address of the malicious source, the malicious IP packet itself or the signature of the malicious packet (if the source address was spoofed) for use by the administrator in locating and/or neutralizing the malicious source.

The processor 210 may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 220 may be a single memory device or a plurality of memory devices. Such a memory device may be a read-only memory, random access memory, volatile memory, non-volatile memory, static memory, dynamic memory, flash memory, and/or any device that stores digital information. Note that when the processor 210 implements one or more of its functions via a state machine, analog circuitry, digital circuitry, and/or logic circuitry, the memory 220 storing the corresponding operational instructions is embedded with the circuitry comprising the state machine, analog circuitry, digital circuitry, and/or logic circuitry.

Figure 5:
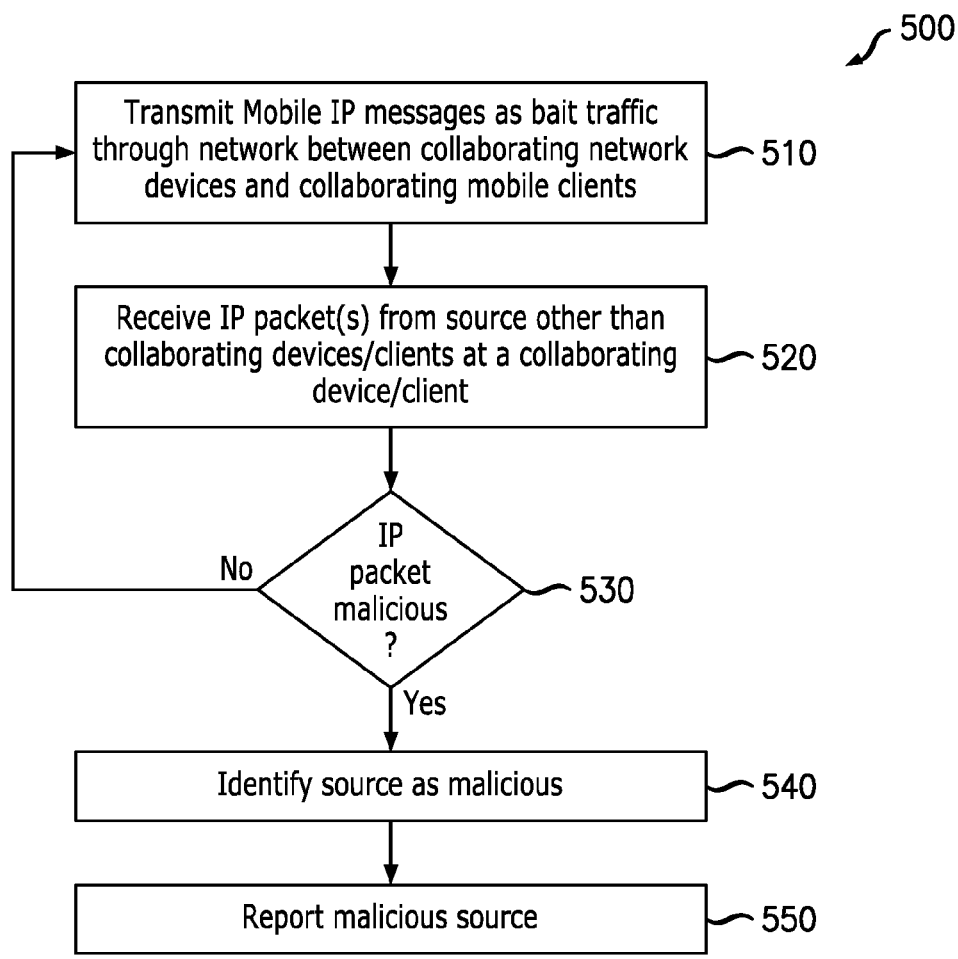
FIG. 5 is a flowchart illustrating an exemplary process for identifying malicious sources in a network, in accordance with embodiments of the present invention.

FIG. 5 illustrates an exemplary process 500 for identifying malicious sources in networks, in accordance with embodiments of the present invention. Initially, at block 510, bait traffic is transmitted between a collaborating network device and a collaborating mobile client that has a fixed connection to the network. The bait traffic includes a Mobile IP (MIP) message or sequence of MIP messages transmitted between the collaborating network device and the collaborating mobile client. By way of example, but not limitation, the bait traffic can include MIP Agent Solicitation messages, MIP Agent Advertisement messages, MIP Registration messages and MIP replies thereto.

At block 520, an IP packet is received at a collaborating network element (i.e., collaborating network device or collaborating mobile client) from a source other than a collaborating source. The traffic may be broadcast traffic transmitted by a "good" client, which is not malicious, or unicast traffic transmitted by a malicious source that is malicious. At block 530, the collaborating network element then determines whether the received IP packet is malicious based on the source address of the IP packet, based on the type of message received or based on the message values within the message itself. For example, if the collaborating network device receives a message destined for the collaborating network device (a unicast message) from a source other than a collaborating mobile client, the collaborating network device can determine that the IP packet is a malicious packet, since a "good" client would not be sending a unicast message to the collaborating network device. As another example, if the collaborating network device receives a message that is out of order, not within the pre-set sequence of messages or includes values that are different from the pre-set message values, the collaborating network device can determine that the IP packet is malicious, even if the source address is spoofed.

If the IP packet is determined to be malicious, at block 540, the collaborating network element identifies the source that originated the malicious packet as a malicious source and, at bloc 550, reports the malicious packet and/or malicious source to the network administrator. For example, the collaborating network device can identify the malicious source based on the source address included in the message, if the source address is not spoofed, and provide the malicious source address to the network administrator. If the source address is spoofed (i.e., the message includes the source address of a collaborating network element), the collaborating network element can identify the IP packet as malicious based on the signature and provide this signature and/or the IP packet itself to the network administrator.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A collaborating network device within a network, comprising:
a network interface operable to transmit and receive bait traffic to and from a collaborating mobile client mimicking an end-user mobile communication device, the collaborating mobile client having a fixed connection to the network, the bait traffic including mobile Internet Protocol (IP) messages, the network interface being configured to communicate with only the collaborating mobile client such that normal traffic other than broadcast traffic is not received from legitimate, non-collaborating sources, the network interface being further operable to receive an IP packet from a source other than the collaborating mobile client; and
a processor coupled to receive the IP packet and operable to determine whether the IP packet is a malicious packet, and if so, to identify the source as a malicious source.

2. The network device of claim 1, wherein the collaborating mobile client is associated with a home network, the network is a visiting network and the network device is a foreign agent within the visiting network, and wherein the source is an infected host within the visiting network.

3. The network device of claim 1, wherein the network is a home network of the collaborating mobile client and the network device is a home agent of the collaborating mobile client, and wherein the source is an infected host within the home network.

4. The network device of claim 1, wherein the network is a home network of the collaborating mobile client, the collaborating mobile client is located in a visiting network and the network device is a home agent of the collaborating mobile client within the home network, and wherein the source is a malicious client that is fixed or mobile within a core network coupled between the home network and the visiting network.

5. The network device of claim 1, wherein the malicious packet is a scan packet or attack packet.

6. The network device of claim 1, wherein the network device is a layer 3 switch, router or server.

7. The network device of claim 1, wherein the Mobile IP messages include at least one of a Mobile IP Agent Solicitation message originated by the collaborating mobile client a Mobile IP Agent Advertisement message originated by the network device and a Mobile IP Registration message originated by the collaborating mobile client or the network device.

8. The network device of claim 1, further comprising:
a memory maintaining a policy table that indicates types of bait packets transmitted between the network device and the collaborating mobile client.

9. The network device of claim 1, wherein the policy table further includes a schedule specifying a frequency or time for transmitting the bait packets between the network device and the collaborating mobile client.

10. The network device of claim 1, wherein the network interface reserves a plurality of unused addresses and bait addresses and provides at least one of the bait addresses to the collaborating mobile client to facilitate transmission of the Mobile IP messages to and from the collaborating mobile client and to enable the malicious source to send the malicious packet to the network device.

11. The network device of claim 1, wherein the IP packet has a spoofed source address identifying the collaborating mobile client, the processor being operable to identify the IP packet as a malicious packet based on a message type or header values within the IP packet.

12. The network device of claim 1, wherein the network interface further provides a connection to a network administrator within the network, the processor being operable to notify the network administrator of the presence of the malicious source in the network via the network interface.

13. A network for identifying a malicious source, comprising:
a collaborating mobile client mimicking an end-user mobile communication device and coupled to transmit and receive bait traffic through the network, the collaborating mobile client having a fixed connection to the network, the bait traffic including mobile Internet Protocol (IP) messages; and
a collaborating network device coupled to transmit and receive the bait traffic to and from the collaborating mobile client, the collaborating network device being configured to communicate with only the collaborating mobile client such that normal traffic other than broadcast traffic is not received from legitimate, non-collaborating sources;
wherein at least one of the collaborating mobile client and the collaborating network device is coupled to receive an IP packet from a source other than the collaborating mobile client or the collaborating network device and operable to determine whether the IP packet is a malicious packet, and if so, to identify the source as a malicious source.

14. The network of claim 13, wherein the collaborating mobile client is associated with a home network, the network device is a foreign agent within the visiting network and the collaborating mobile client has a fixed connection to the visiting network, and wherein the source is an infected host within the visiting network.

15. The network of claim 13, wherein the network is a home network of the collaborating mobile client and the network device is a home agent of the collaborating mobile client, and wherein the source is an infected host within the home network.

16. The network of claim 13, wherein the collaborating mobile client is associated with a home network, the collaborating mobile client is located in a visiting network and the network device is a home agent of the collaborating mobile client within the home network, and wherein the source is a malicious client that is fixed or mobile within a core network coupled between the home network and the visiting network.

17. The network of claim 13, further comprising:
a network administrator coupled to receive a notification message from one of the collaborating mobile client and the collaborating network device of the presence of the malicious source.

18. The network of claim 13, wherein the network device is a layer 3 switch, router or server.

19. The network of claim 13, wherein at least one of the collaborating mobile client and the collaborating network device maintains a policy table that indicates types of bait packets transmitted between the network device and the collaborating mobile client and a schedule specifying a frequency or time for transmitting the bait packets between the network device and the collaborating mobile client.

20. A method for identifying malicious sources within a network, comprising:

transmitting bait traffic between a collaborating mobile client and a collaborating network device, the collaborating mobile client mimicking an end-user mobile communication device and having a fixed connection to the network, the bait traffic including mobile Internet Protocol (IP) messages;

configuring the collaborating network device to communicate with only the collaborating mobile client such that normal traffic other than broadcast traffic is not received from legitimate, non-collaborating sources;

receiving an IP packet at the collaborating mobile client or the collaborating network device from a source other than the collaborating mobile client or the collaborating network device;

determining whether the IP packet is a malicious packet;

if so, identifying the source as a malicious source; and reporting the presence of the malicious source in the network.

* * * * *